Patented Mar. 5, 1935

1,993,646

UNITED STATES PATENT OFFICE 1,993,646

PROCESS OF DE-EMULSIFICATION FOR PETROLEUM OIL EMULSIONS

Arthur W. Burwell, Niagara Falls, N. Y., assignor to Alox Chemical Corporation, New York, N. Y., a corporation of New York No Drawing. Application January 16, 1931, Serial No. 509,274

8 Claims. (Cl. 196—4)

The present invention relates to the preparation of de-emulsifying agents, and to the use thereof in breaking water-in-oil emulsion, e g., emulsions of water in petroleum oils.

Investigators heretofore have proposed breaking water-in-oil emulsions by treating the same with a composition containing a hydrophile colloid such as the so-called "modified fatty acids", certain sulfonated fatty acids, or certain water-soluble soaps including especially sodium oleate, gelatin, or starch.

I have found that there may be used, to good advantage, as de-emulsifying agents in the foregoing general process relatively very small amounts of organic products or mixtures thereof obtained by or derived from intermediate products produced during the controlled liquid-phase oxidation of hydrocarbons of mineral origin. Since the agents forming the basis of the present invention are, generally, not designatable by chemical names, and since they are for the most part mixtures of organic compounds of different characteristics and incompletely known constitutions, their natures will be further described hereinafter by recourse to a description of the process by which they are prepared. By "relatively very small amounts" I mean varying from .001% to .1% of the amount of emulsion to be treated, for commercially rapid de-emulsification. In rare cases amounts somewhat in excess of .1% may be necessary.

For preparing the de-emulsifying agents aforesaid I contact an oxidizing gas, such as air or oxygen-enriched air, with a body of hydrocarbon such, for instance, as a body of petroleum hydrocarbon mixture which may consist of normally solid petroleum waxes including "Sharples wax", scale wax, rod wax and the like and/or normally liquid petroleum distillates either light or heavy, in liquid phase and at a temperature higher than normal room temperature but not above about 155° C., and at a super-atmospheric pressure which may amount to 350 pounds per square inch,—say, at a pressure of about 250 pounds per square inch,—in the presence of a promoter of oxidation which may consist of a known oxidation catalyst such, for instance, as an organic salt of manganese, e. g., manganese oleate, in an amount equal to about 0.1% of the aforesaid body, or of unsaponifiable hydrocarbons and oxygen compounds thereof derived as by-products from a like oxidation in an amount up to 50% of the charge, or of both, the oxidation preferably being continued at least until incipient precipitation of compounds insoluble in the reaction mixture is indicated in a test sample of the body or at least until a substantial proportion of saponifiable products has been formed therein.

I have found that treatment of a water-in-oil emulsion with a suitable amount of the whole reaction mixture resulting from the carrying out of the above-described oxidation procedure may effect a breaking of the emulsion. In the case of the oxidation of a crude paraffin wax starting material, I may, for example, protract the oxidation treatment until there has accumulated in the reaction mixture acidic compounds amounting to about one-half of the mass: the resulting product in its entirety may be used as the de-emulsifying agent. However, I may separate from the reaction mixture certain related products which by themselves or in modified forms may be used in relatively small amounts to treat emulsions whereby to break the latter.

In a typical reaction mixture obtained as aforesaid there are found a plurality of components including, in varying proportions (depending upon the composition of the raw material, the conditions of oxidation, the duration of the period of oxidation, and perhaps other variables), the following:

1. Unoxidized hydrocarbons;
2. Non-acidic and unsaponifiable oxygen compounds of hydrocarbons, and consisting essentially of compounds of ketonic and alcoholic constitution;
3. Relatively low molecular weight aliphatic acids which are soluble in water and are volatile at temperatures only slightly above the temperature maintained during the oxidation;
4. Simple water-insoluble but petroleum-soluble, saponifiable carboxylic acids having molecular weights apparently one and one-half times those which would naturally be calculated for acids derived from the original (i. e., unoxidized) hydrocarbons;
5. Lactones and esters derived from the aforesaid acids by condensation; and, where the oxidation is sufficiently protracted,
6. Hydrocarboxylic acids which are insoluble in water and in petroleum and which have molecular weights equivalent to about one-half those which would naturally be calculated for acids derived from the original hydrocarbons by replacement of a methyl group by a carboxyl group without splitting of the molecule.

My methods of separating these components into more or less related groups are as follows:

To the mass of reaction mixture, either with or without separation (by gravity settling) and removal of any bodies insoluble in the reaction mixture (which insoluble bodies are saponifiable and apparently unobjectionable in the resulting product), there is added with thorough agitation an aqueous solution of an alkali such, for instance, as caustic soda, ammonia, or the like, in an amount sufficient to saponify the saponifiable constituents of the mass (including especially the aforesaid simple carboxylic acids) and the resulting mixture is allowed to stand, whereupon there separates a supernatant layer and beneath it an aqueous soapy layer. The said supernatant layer is oily, and consists of a mixture of unsaponifiable compounds including unoxidized hydrocarbons and ketonic, and alcoholic, compounds. This oily mixture, which may represent one-half, more or less, of the whole reaction mixture, when admixed with sufficient raw (i. e., unacted on) hydrocarbons to yield a batch, exerts an effect upon the speed and character of the ensuing oxidation equivalent or even superior to that obtained by the use of manganese oleate or other oxidation catalyst.

The said aqueous soapy layer contains water-soluble salts, i. e., alkali metal or ammonium soaps, of the saponifiable constituents of the oxidation reaction mixture and as well a material amount of unsaponifiable constituents, mainly the aforesaid oxidation products of ketonic constitution, which tenaciously adhere to the said salts persisting with them in a not too dilute aqueous solution in what appears to be dissolved form. The proportion of these unsaponifiable bodies in said soapy layer may be decreased in part only by diluting the same with water. The resulting clear solution may be dehydrated, as by careful distillation at a low temperature or by evaporation: the dehydrated product is an operable de-emulsifying agent.

I may, however, treat this aqueous layer with an agent capable of decomposing the said salts, e. g., a relatively small but effective amount of an inorganic or organic acid, say sulfuric acid, whereupon the salts are decomposed freeing the aforesaid carboxylic acids and precipitating the same together with the said associated unsaponifiable ketonic bodies. I have found that the mixture so precipitated from said soapy layer is effective as a de-emulsifying agent: where it is to be used as such agent without resorting to a separation of its constituents, I simply separate the precipitated mass from the resulting aqueous solution of sulfate salt. The product contains from 1 to 3% of moisture; it may but need not be dried before use. The major portion of the product is acidic in constitution (i. e., free acids with esters and lactones therefrom in varying amounts), the associated unsaponifiable bodies being in minor amount; e. g., in the case of the mixture obtained as above described using as starting material a crude paraffin wax, about 30 to 35%.

As an alternative method for the separation of the above-described mixture consisting mainly of oxidized hydrocarbons of acidic constitution I may treat the oxidation reaction mixture with an appropriate solvent for the "saponifiable portion" thereof, such, for instance, as ethyl alcohol, acetone, a higher alcohol, or the like, e. g., 95% alcohol, preferably carrying out the extraction at such a temperature as insures maintaining the materials in liquid state. Careful distillation removes the solvent, yielding the desired acidic mixture.

The aforesaid supernatant oily layer likewise is productive of a de-emulsifying agent. That is to say, I may by suitable methods separate out of the oily layer a substantial amount of the oxidized hydrocarbons of ketonic constitution, which latter have de-emulsifying properties. One operable method by which such separation may be effected consists in extracting the "ketones" with ether, or other equivalent organic solvent, and recovering the ether therefrom. An agent having individual characteristics is prepared therefrom by subjecting the same to treatment with a known agent of sulfonation, e. g., concentrated sulfuric acid, oleum or the like under the conditions generally obtaining in the sulfonation of organic compounds, thereby producing sulfonic acid compounds of said "ketones" which exhibit good de-emulsifying properties.

I claim:

1. Process of de-emulsifying water-in-oil emulsions which comprises treating the emulsions with small but effective amounts of constituents of the mixture obtained by contacting an oxidizing gas with a mixture of hydrocarbons of mineral origin, in the liquid phase and at an elevated temperature not materially above 155° C. and a super-atmospheric pressure up to 350 pounds per square inch, in the presence of a promoter of oxidation, until a material amount of acidic compounds soluble in the reaction mixture are formed, thereby producing a reaction mixture containing unoxidized oil and both saponifiable and unsaponifiable oxidation products of hydrocarbons, and separating out at least the major proportion of the unsaponifiable oxidation products and the unoxidized oil from said reaction mixture whereby to obtain a mixture consisting largely of saponifiable acidic oxidation products of hydrocarbons.

2. Process of de-emulsifying a water-in-oil emulsion which comprises treating the emulsion with a small but effective amount of the mixture obtained by contacting an oxidizing gas with a mixture of hydrocarbons of mineral origin, in the liquid phase and at an elevated temperature not materially above 155° C. and a super-atmospheric pressure up to 350 pounds per square inch, in the presence of a promoter of oxidation, until a material amount of acidic compounds soluble in the reaction mixture are formed, thereby producing a reaction mixture containing unoxidized oil and both saponifiable and unsaponifiable oxidation products of hydrocarbons, treating the reaction mixture with an aqueous solution of a saponifying agent of the group consisting of alkali metal hydroxides, alkali metal carbonates, and ammonia, thereby producing a mixture which upon settling will yield a supernatant oily layer and an aqueous soapy layer, and separating out the aqueous soapy layer.

3. Process of de-emulsifying a water-in-oil emulsion which comprises treating the emulsion with small but effective amount of the mixture obtained by contacting an oxidizing gas with a mixture of hydrocarbons of mineral origin, in the liquid phase and at an elevated temperature not materially above 155° C. and a super-atmospheric pressure up to 350 pounds per square inch, in the presence of a promoter of oxidation, until a material amount of acidic compounds soluble in the reaction mixture are formed, thereby producing a reaction mixture containing unoxidized oil and both saponifiable and unsaponifiable oxidation products of hydrocarbons, treating at least a part of the reaction mixture with a solvent for the said unsaponifiable oxidation products of the group including alcohol, acetone, and ether, whereby to obtain an extract therein, separating the extract from the reaction mixture, and removing the said solvent.

4. Process of de-emulsifying a water-in-oil emulsion which comprises treating the emulsion with small but effective amount of the mixture obtained by contacting an oxidizing gas with a mixture of hydrocarbons of mineral origin, in the liquid phase and at an elevated temperature not materially above 155° C. and a super-atmospheric pressure up to 350 pounds per square inch, in the presence of a promoter of oxidation, until a material amount of acidic compounds soluble in the reaction mixture are formed, thereby producing a reaction mixture containing unoxidized oil and both saponifiable and unsaponifiable oxidation products of hydrocarbons, treating at least a part of the reaction mixture with a solvent for the said unsaponifiable oxidation products of the group including alcohol, acetone, and ether, whereby to obtain an extract therein, separating the extract from the reaction mixture, removing the said solvent, treating the so extracted material with a sulfonating agent, and separating the resulting sulfonated material from the latter.

5. Process of de-emulsifying a water-in-oil emulsion which comprises treating the emulsion with a small but effective amount of a mixture of oxidized hydrocarbons obtained by the controlled liquid-phase partial oxidation of hydrocarbons of mineral origin at an elevated temperature not materially above 155° C. and at a superatmospheric pressure up to 350 pounds per square inch, in the presence of a promoter of oxidation, whereby there is produced a reaction mixture containing unoxidized hydrocarbons and both saponifiable acidic and unsaponifiable oxidation products of hydrocarbons, and thereafter removing at least the unoxidized hydrocarbons from said reaction mixture.

6. Process of de-emulsifying a water-in-oil emulsion which comprises treating the emulsion with a small but effective amount of a mixture consisting essentially of water-soluble soaps of acidic compounds derived from hydrocarbons of mineral origin by the controlled liquid-phase oxidation thereof at an elevated temperature not materially above 155° C. and at a superatmospheric pressure up to 350 pounds per square inch, in the presence of a promoter of oxidation, with subsequent separation of acidic compounds from the resulting reaction mixture by saponification of the saponifiable constitutents of the latter.

7. Process of de-emulsifying a water-in-oil emulsion which comprises treating the emulsion with a small but effective amount of a mixture consisting essentially of unsaponifiable ketonic compounds derived from hydrocarbons of mineral origin by the controlled liquid-phase oxidation thereof.

8. Process of de-emulsifying a water-in-oil emulsion which comprises treating the emulsion with a small but effective amount of a mixture consisting essentially of sulfonic acid derivatives of unsaponifiable ketonic compounds derived from hydrocarbons of mineral origin by the controlled liquid-phase oxidation thereof.

ARTHUR W. BURWELL.